United States Patent [19]

Seeman

[11] Patent Number: 4,786,984
[45] Date of Patent: Nov. 22, 1988

[54] METHOD AND APPARATUS FOR LOCATING THE EDGE OF A MAGNETIC TAPE

[75] Inventor: Steven R. Seeman, Moundsview, Minn.

[73] Assignee: Minnesota Mining and Manufacturing Company, St. Paul, Minn.

[21] Appl. No.: 938,641

[22] Filed: Dec. 5, 1986

[51] Int. Cl.⁴ .................... G11B 27/36; G11B 5/02
[52] U.S. Cl. ........................................ 360/31; 360/67
[58] Field of Search .................. 360/27, 31, 67, 69, 360/75

[56] References Cited

U.S. PATENT DOCUMENTS

| | | | |
|---|---|---|---|
| 3,692,255 | 9/1972 | Von Behren | 242/192 |
| 3,861,619 | 1/1975 | Wolff | 242/188 |
| 4,176,381 | 11/1979 | de Niet et al. | 360/77 |
| 4,347,534 | 8/1982 | Kimura | 360/77 |
| 4,390,917 | 6/1983 | Watanabe | 360/128 |
| 4,396,960 | 8/1983 | Matla et al. | 360/77 |
| 4,399,474 | 8/1983 | Coleman, Jr. | 360/67 |
| 4,422,111 | 12/1983 | Moeller et al. | 360/72.1 |
| 4,472,750 | 9/1984 | Klumpp et al. | 360/78 |
| 4,476,503 | 10/1984 | Solhjell | 360/75 |
| 4,528,602 | 7/1985 | Crick | 360/67 |
| 4,582,235 | 4/1986 | Schulz | 226/20 |
| 4,688,113 | 8/1987 | Parsons | 360/31 |

Primary Examiner—Vincent P. Canney
Attorney, Agent, or Firm—Donald M. Sell; William B. Barte

[57] ABSTRACT

A method and apparatus for magnetically detecting the edge of a magnetic recording tape to enable accurate positioning of a tranversely movable recording/playback unit at any of a plurality of track locations across the width of the tape. The gain of a playback amplifier is first dynamically adjusted in response to a played back periodic test signal based on the number of flux transitions detected during playback of a given length of tape, and an edge of tape reference position thereafter establishing by comparing the number of flux transitions detected during the playback of a periodic test signal recorded along the edge of a given length of tape when the recording/playback unit is successively stepped toward the edge of the tape.

22 Claims, 7 Drawing Sheets

METHOD AND APPARATUS FOR LOCATING THE EDGE OF A MAGNETIC TAPE

FIELD OF THE INVENTION

This invention relates to a method and apparatus for defining a reference location of a magnetic recording and playback unit which corresponds to an edge of a magnetic recording tape so that the unit may be subsequently moved transversely to the edge of the tape precise distances from the reference location to enable information to be recorded and played back from any one of a plurality of longitudinal tracks on the tape.

BACKGROUND OF THE INVENTION

A variety of techniques for controlling the transverse position of a magnetic recording/playback head relative to a magnetic tape have been proposed and used in the past. For example, simple mechanical detents have been employed for positioning the heads at a series of transverse positions relative to a tape transport path defined by tape guide members. Such a technique may be suitable for systems such as those designed for use with eight track audio cartridges in which only eight tracks are recorded on one-quarter inch wide tapes. In most current systems, the recording tape is contained within some type of cartridge or cassette which also includes tape guide members. These members, either solely, or in combination with other members forming a part of the tape drive, control the transverse position of the tape such that any variation in the positioning of the cartridge within the drive or in the tolerances of the cartridges themselves will result in a variation in the final transverse position of the tape. Such a final position will vary even as the same cartridge is repeatedly removed and reinserted in the same drive. Such variations can be tolerated in systems in which each track is relatively wide and is separated by a similarly wide space from an adjacent track, such as in the eight track audio cartridge system.

Newer systems, in which significantly narrower tracks are desirably used and in which the tracks are placed much closer together, such as when over twenty tracks are to be recorded on 6.4 mm wide tape, have been found to require a much tighter control over the transverse position of the heads relative to the tape. Accordingly, methods have been developed for sensing the actual tape edge, apart from the specific positioning of a cartridge or cassette within which the tape is located. Thus, for example, optical and mechanical sensors have been so employed, with such additional components contributing to the complexity and expense of the drive and providing additional sources of malfunction.

It has also been previously proposed to detect the edge of the tape magnetically. Thus as disclosed in U.S. Pat. No. 4,422,111 (Moeller and Wolff), a magnetic tape may be pre-recorded with patterns which extend from one edge of the tape to the other, and a playback head thereafter incrementally positioned at successive positions ever closer to an edge of the tape. The prerecorded patterns are thus sensed until the head moves off the edge, at which point no further playback signal is detected, thus establishing a head reference position corresponding to the edge of the tape, and from which a plurality of parallel tracks along the tape may be indexed. The system there disclosed was adapted only for use with such a preformatted tape.

U.S. Pat. No. 4,476,503 (Solhjell) also depicts a method for magnetically sensing the edge of tape via recorded patterns bordered by one edge of the tape. As there shown, a combined read after write head is mounted on a single support. As the tape is moved longitudinally, the support is moved transversely toward the tape from a position off the edge of the tape. At the same time, a signal is applied to the write head and any thus recorded signal is immediately reproduced by the read head. The edge of tape is proposed to be determined by comparing the read signal to a constant prescribed reference value, or by determining the difference between two read signals obtained at different points in time and comparing that difference to a prescribed reference value. While the techniques depicted in these patents may be useful in certain circumstances, each has certain limitations: the method of Moeller et al. can only be used with preformatted media, while that of Solhjell suggests only the use of a fixed reference value.

SUMMARY OF THE INVENTION

In contrast to the techniques discussed above, in one embodiment, the present invention is directed to a method of magnetically detecting the edge of a magnetic recording tape in which no prerecorded pattern need be present and in which errors in determining the edge position due to variations in magnetic tape type, head output and head to tape interface are avoided. In such a method a record and playback unit is provided which includes record means and playback means, such as recording and playback heads, having gaps parallel to each other, wherein the gap width of the record means is less than one-tenth the tape width. The playback means has a gap width no greater than the gap width of the record means.

The unit is positioned at a first transverse location away from the tape edge, so as to be entirely within the bounds of the tape, and a first test signal is recorded along a track having a transverse width at least equal to the gap width of the playback means. A corresponding playback test signal is then played back, and the gain of a playback signal amplifier is fixed to provide an output at a predetermined level in the presence of a said playback signal. A reference value is then stored which is a given fraction of the predetermined level, and which corresponds to a minimum threshold detection level at which recorded signals are reliably detected. In this manner, the reference level may be dynamically determined each time a tape is positioned adjacent the record/playback unit, thereby avoiding errors in subsequently determining edge of tape reference positions based on the absence of detected playback signals as could be due to an improperly selected minimum threshold detection level.

Once such a level is dynamically determined, in one embodiment the method of the present invention further comprises determining an edge of tape reference position by recording a second test signal along a track bounded by one edge, incrementally positioning the unit at a plurality of transverse locations, each of which is successively closer to the edge, and differs from a previous position by a small fraction of the record gap width and playing back a corresponding test signal at each successive transverse position. The level of each corresponding output from the signal amplifier is then compared with the previously obtained and stored reference value, and information indicative of the transverse position of the unit when a given output signal is substantially equal to said reference value is stored as an edge of tape reference position. Subsequent transverse locations of the unit are thus enabled to be indexed relative to the edge of tape reference position, so that signals may be recorded on and played back from any one of a plurality of parallel tracks along the tape.

In another embodiment of the present invention, a minimum threshold detection level is dynamically selected by the following steps:

(a) applying to the record means a test signal containing a series of pulses;

(b) moving the tape past the record means, thereby recording onto at least a predetermined length of the tape a predetermined number of flux transitions;

(c) moving the tape past the playback means to playback a corresponding playback test signal derived from the predetermined number of flux transitions;

(d) counting the number of transitions occurring in the playback test signal while the predetermined length of tape traverses the playback means; and (e) fixing the gain of a playback signal amplifier to provide an output when a fixed number of transitions which are a given fraction of the transitions in the playback test signal are detected during the passage of said predetermined length of tape. A minimum threshold detection level is thus established at which flux transitions having an intensity at least as great as said given fraction are reliably detected.

In a further preferred embodiment of the previously described method, the step of fixing the gain comprises:

(a) modifying the playback test signal to provide a calibrate signal which is a predetermined fraction of the playback test signal, (b) counting and comparing the number of transitions in the calibrate signal occurring during the passage of the predetermined length of tape with the number of transitions in the playback test signal normally counted during the passage of the same length of tape at successive settings of the gain of said playback signal amplifier, and (c) fixing the gain of the amplifier when the number of counted transitions in the calibrate signal equals the fixed number.

In such an embodiment, once the minimum threshold detection level is thus dynamically selected, the edge of tape reference position is desirably determined by:

(a) recording such a test signal along a track bounded by one edge of the tape, and extending along at least a predetermined length thereof, (b) incrementally positioning the playback means at a plurality of transverse locations, each of which is a small fraction of the width of the recorded track closer to the edge, and playing back a corresponding test signal at each successive position as the predetermined length of the tape transverses the playback means, (c) counting the number of transitions occurring in the corresponding test signal during the passage of the predetermined length of tape, the intensity of which exceeds the minimum threshold detection level, (d) comparing the number of counted transitions in the test signal occurring during the tape passage with the fixed number, and (e) storing information indicative of the transverse position of the playback head when the counted transitions falls below the fixed number, as an edge of tape reference position. Subsequent transverse locations of the record and playback unit are thereby enabled to be indexed relative to the edge of tape reference position to enable subsequent recording and playback of signals on any of a plurality of parallel tracks along the tape.

DETAILED DESCRIPTION

Figure 1A:
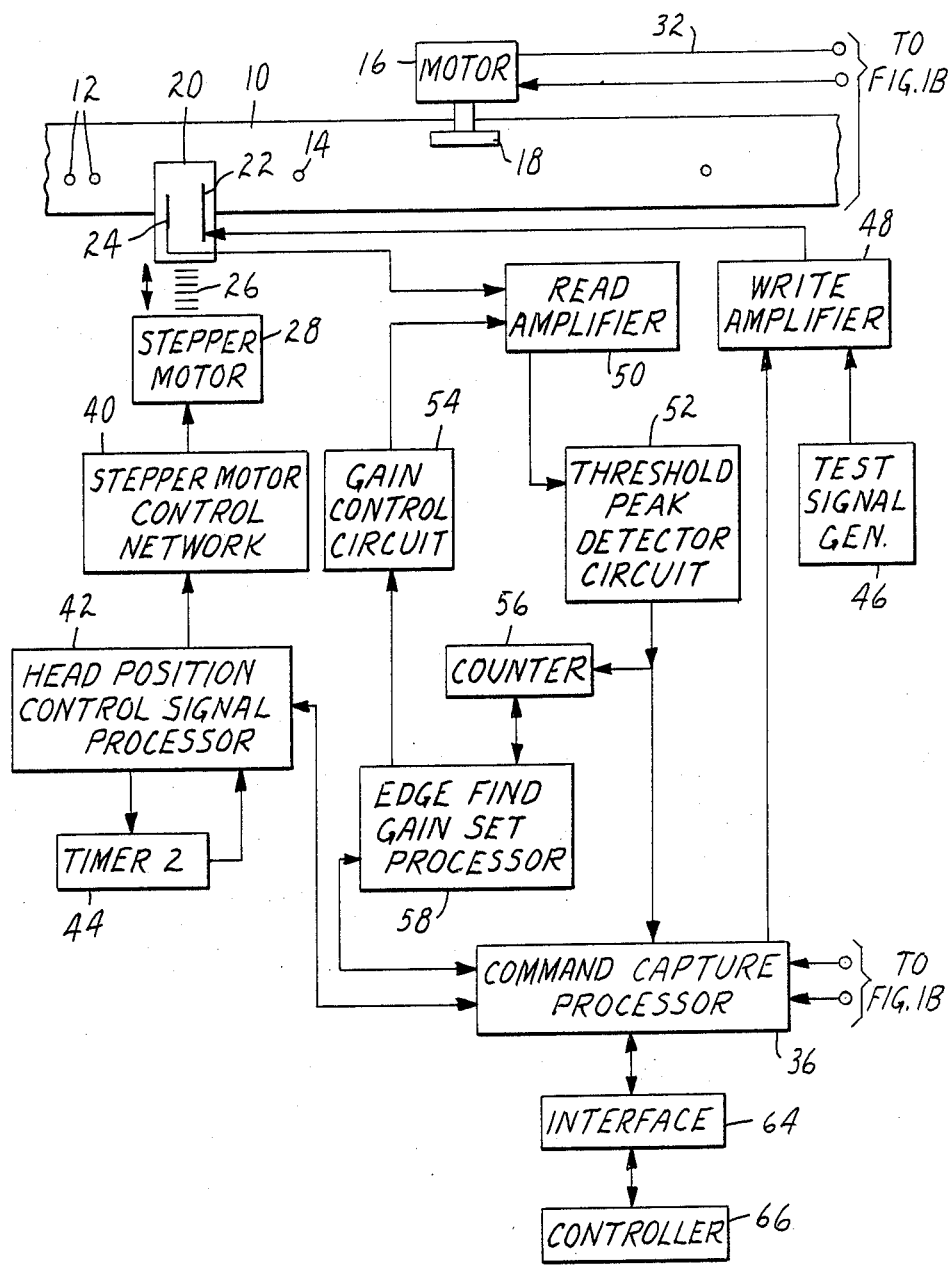
FIG. 1 is a block diagram of the system of the present invention.
Figure 1B:
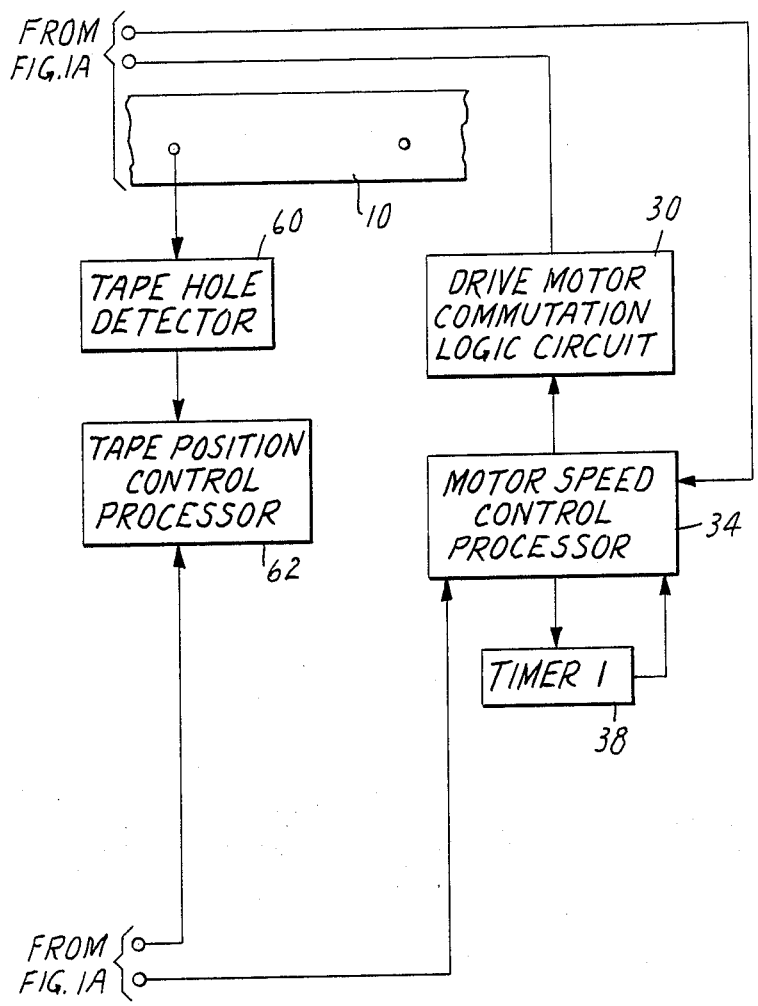

The dynamic gain set and edge seek features of the present invention are particularly desirably implemented in a drive adapted for use with a belt-driven tape cartridge of the sort disclosed in U.S. Pat. No. 3,692,255 (VonBehren) and 3,861,619 (Wolff). As particularly set forth in the latter patent, such a cartridge is desirably provided with a tape containing a series of hole patterns to enable detection of particular regions of the tape. Thus, for example, as shown in FIG. 1, a tape 10 contained within such a cartridge will have a pattern of double holes 12 indicative of the beginning of tape (BOT) and spaced a predetermined distance therefrom a single hole 14 indicative of the load point (LP), i.e., the point at which normal recording operations may begin. Thus, for example, if the cartridge is of a type generally identified as a type DC-1000 cartridge, there will be approximately 18 inches (48 cm) of tape between the BOT and LP identification holes 12 and 14 respectively, whereas if it is a type DC-2000 cartridge approximately 30 inches (76 cm) of tape will be present between those respective points.

Such a cartridge is adapted for recording and playing back of data on a plurality of parallel tracks extending longitudinally along the length of the tape while the tape is driven via a brushless DC motor 16 which is coupled to a drive puck 18 in contact with a capstan (not shown) within the cartridge. Recording and playback of the respective tracks is enabled by a record and playback unit 20 within which are mounted a record head 22 and a playback head 24. In a preferred embodiment, an inexpensive unicore dual gap wide write (8 mils, 203 μm) and narrow read head (5 mils, 127 μm) is employed. The record/playback head unit 20 is mounted so as to be transversely movable across the width of the tape by means of a lead screw 26 and stepper motor mechanism 28.

The longitudinal motion of the tape 10 is, as noted above, under control of a motor 16, which motor is energized by signals from a drive motor commutation logic circuit 30. The motor further includes sensors which provide a tachometer signal on lead 32 which is coupled to a motor speed control processor 34. The processor 34 is in turn controlled by general command instructions from a command capture processor 36 and by time control signals from a timer circuit 38. Thus, depending upon the desired tape speed, such as 60 inches per second (152 cm/sec) for normal recording and playback operations or 90 inches per second (229 cm/sec) for high speed fast forward or reverse operation, the processor 34 responds to input signals from the timer 38 and the tachometer pulses on lead 32 to provide a speed control signal to the drive motor commutation logic circuit 30, which in turn provides motor drive signals to the motor 16.

The longitudinal position of the tape 10 is determined by detecting the punched holes extending along the tape, such as the BOT and LP holes 12 and 14, with a tape hole detector 60. The output of that detector is in turn coupled to a tape position control processor 62 which is in turn controlled by and provides control to the command capture processor 36.

The command capture processor 36 is in turn coupled through appropriate interface circuits 64 to a master controller 66 which handles communications with higher level logic circuits to implement the actual recording and reproduction of typical data.

The transverse position of the head 20 is, as noted above, controlled by a stepper motor 28 which in turn responds to signals from a stepper motor control network 40. That network is in turn controlled by a head position control signal processor 42 and provides signals in response to overall commands from the command capture processor 36 and a second timer circuit 44.

The present invention is particularly useful in maintaining precise transverse control of the record/playback unit 20. Thus, for example, in a preferred embodiment as many as 24 tracks are desirably recorded and reproduced on a 6.4 mm wide tape. To enable such a record/playback unit 20 to be accurately positionable at any one of such a plurality of tracks requires that both the accuracy of the edge seek method as well as the reproducible accuracy provided by the stepper motor and lead screw combination 26 and 28 be tightly controlled. Thus in the present embodiment, the accuracy of the edge seek is within plus or minus one step of the stepper motor, each step being 0.156 mils (4 $\mu$m) of transverse head movement. As discussed in more detail below, with such a mechanism, the edge seek feature has been found to be repeatable to within plus or minus two steps of the stepper motor. This repeatability is also been found to be the key in the ability to achieve interchange of cartridges so that a given cartridge may be recorded on one drive and played back on a second drive. Also as further discussed below, the precision in both head position and edge seeking is further facilitated by determining an edge of tape reference position from two directions, i.e., by moving the head both onto and off of the tape as the edge of tape is sensed. This allows the amount of hysteresis to be measured and controlled.

In performing both the dynamic gain set and edge seek functions, test signals are first recorded onto tape 10 and those signals subsequently reproduced and processed to perform the respective functions. Thus, as shown in FIG. 1 test signals are provided by a test signal generator 46, which signal is coupled through a write (record) amplifier 48 and thence to the record head 22. As the apparatus of the present invention is particularly adapted for processing digital data in which the data is encoded at a particular clock frequency, it is convenient that the test signal generator 46 provide a square wave at that clock frequency, such as a 250 kilohertz square wave.

A thus recorded signal may be subsequently reproduced by the playback head 24, which signal is then coupled to the read (playback signal) amplifier 50. The output from the amplifier 50 is coupled to a threshold and peak detector circuit 52. The read amplifier 50 is further controlled by a gain control circuit 54. The output of the threshold peak detector circuit 52 is in turn coupled to a counter 56 which in turn is controlled by the edge find and gain set processor 58 to provide a feedback circuit to the gain control circuit 54 to ultimately control the gain of the amplifier 50.

Figure 3:
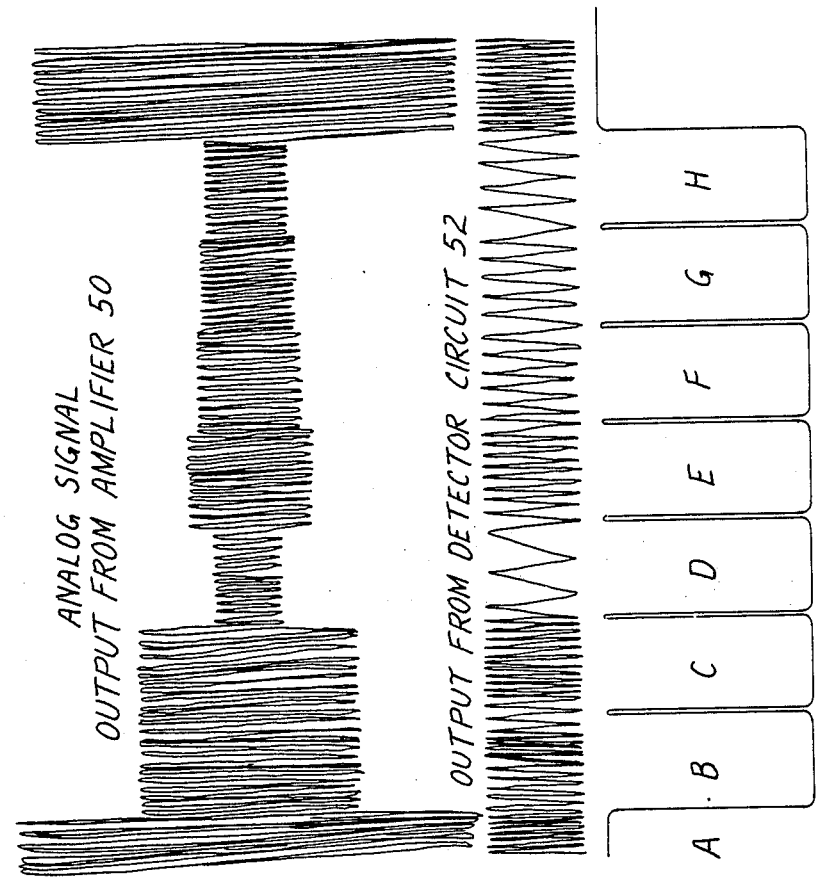
FIG. 3 is a representation of signal waveforms typically present while performing certain steps set forth in FIG. 2.

The threshold and peak detector circuit 52 responds to the analog output from the read amplifier 50 as shown in the top waveform of FIG. 3, and outputs a TTL signal whose transitions represent the peaks of the detected analog signal pulses so long as the output from the read amplifier exceeds a minimum threshold level (Middle waveform of FIG. 3). Thus, for example, so long as the playback signal exceeds a minimum threshold level, a square wave at 250 kilohertz will be detected.

These pulses are in turn coupled to the counter 56 to thereby count the number of pulses occurring during the passage of a predetermined length of tape. Accordingly, a signal indicative of the passage of a length of tape, such as two inches (5.1 cm) of tape, is derived from the tachometer output on lead 32, which in turn is processed through the motor speed control processor 34, through the command capture processor 36, and back to the edge find gain set processor 58 to provide an activate signal to the counter 56 to initiate the counting of the pulses received from the threshold circuit 52. Upon deactivation of the counter in response to a second signal, indicative of the passage of the predetermined length of tape, the level in the counter 56 is fed out to the edge find gain set processor 58. Depending upon the number of counts measured during the passage of tape, an appropriate signal is applied to the gain control circuit 54. The passage of successive predetermined lengths of tape thus establish a sequence of sample windows during which the gain of the amplifier 50 may be sequentially adjusted. Such successive windows are identified as zones C-H at the bottom of FIG. 3.

Thus in operation, the control circuit 54 is caused to sequentially vary the gain of the read amplifier 50, such that the output signal from the amplifier will similarly vary. Thus, for example, the output from the read amplifier 50 may be represented as shown in the analog waveform at the top of FIG. 3. Such a signal is processed through the threshold peak detector circuit 52 to provide corresponding output pulses only when the input pulses exceed a minimum threshold level, for example, 400 millivolts. Thus, as shown in the center waveform in FIG. 3, when the gain of the amplifier is set high, as in the left hand portion of the FIGURE, a large number of pulses will be output from the threshold peak detector circuit. Conversely, when the gain of the amplifier is appreciably reduced, relatively few pulses will be output from the detector circuit 52. It may be noted that a desired minimum threshold level is that at which the number of counts counted during a given sample window is approximately equal to some small number, such as 44. Thus, for example, if all of the possible counts produced during a given sample window exceed the threshold, the total number of counts would be approximately 8300. Thus by establishing a minimum number of counts, such as 44, it will be seen that at the established threshold only pulses resulting from valid flux transitions are counted, and that the absence of pulses such as due to dropouts and other tape irregularities will not produce erroneous results.

The gain control circuit 54 includes a seven bit d/a converter, thus providing a seven bit digital gain control which is converted into an analog signal to actually control the gain of the amplifier 50. The seventh, or most significant, bit adds a factor of five increase in the gain of the amplifier, while the remaining six bits linearly controls the gain of the amplifier 50. Each of the remaining six bits is adapted to be set during one of the successive sample windows. The removal of the seventh bit automatically reduces the gain of the amplifier to twenty percent of the initial level and thus provides a particularly desired calibrate signal. Similarly, as each of the decreasingly significant bits of the remaining six bits are set to zero, the gain of the amplifier will be similarly reduced, thus providing sixty four discrete controllable levels of gain.

Figure 2:
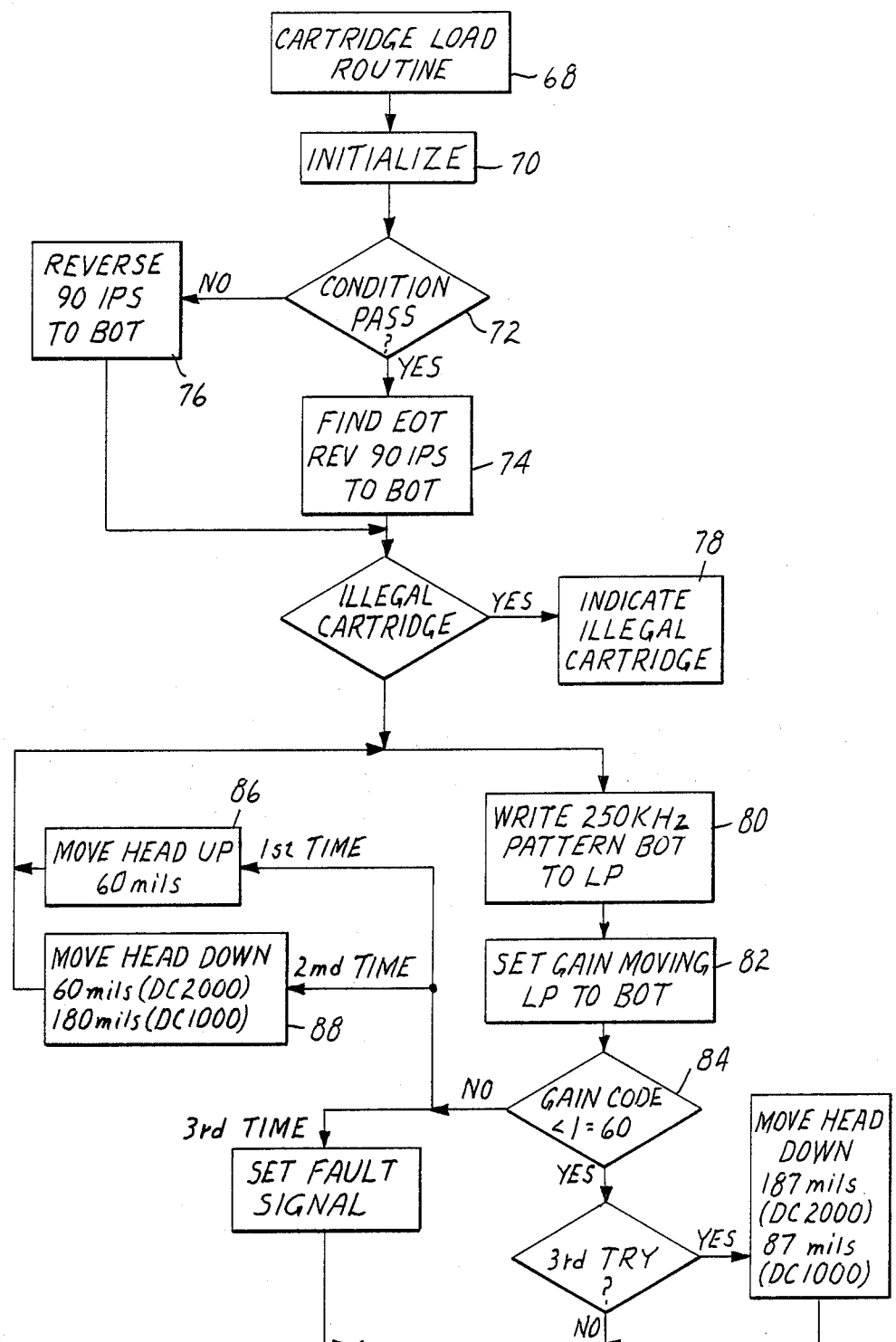
FIG. 2 is a flow sheet showing the sequence of operations desirably performed while fixing the gain according to the present invention.

The use of the above described equipment to dynamically set the gain of the playback signal amplifier 50 is desirably explained in conjunction with the flow sheet shown in FIG. 2. Furthermore, typical wave shapes of signals processed at various stages through the flow sheet are set forth in FIG. 3.

As set forth in FIG. 2, each time a cartridge is inserted into the drive, a switch is activated which in turn activates a cartridge load routine 68. This in turn causes an initialization sequence 70 to be performed in which indicator lights are set, beginning of tape (BOT) and load point (LP) sense routines are established and the like. Subsequent to an initialization operation, an optional conditioning of the tape pack may be performed as set forth in box 72. If such a conditioning operation is desired, the tape will be rapidly cycled to the end of tape and thereupon reversed back to the beginning of tape, as set forth in box 74. If the conditioning operation is not desired, the tape will simply be positioned at the BOT position as set forth in box 76. In the event appropriate hole patterns are not sensed at BOT and LP points, the cartridge will be identified as being improper and an illegal cartridge indicate signal produced as shown in box 78.

At this point, the dynamio gain adjustment operations are commenced. The initial operation, as shown in box 80, is to record a 250 kilohertz test signal beginning at the BOT point and extending to the LP point as defined by the hole patterns 12 and 14 identified in FIG. 1. The direction of the tape is then reversed so as to move from LP to BOT and a sequence of gain adjustment operations is performed as set forth in box 82. Upon initially moving from LP to BOT, a large amplitude playback signal as shown at position A of FIG. 3 will be detected. Upon clearing of the seventh bit in the gain control, that amplitude will be then reduced to twenty percent as shown in zone B. After a short period of time represented in zone B during which the signal is allowed to stabilize, a first gain adjustment is performed in zone C. In this zone, the next most significant bit or bit six is inspected to determine whether the input signal exceeds a minimum threshold level. Thus within the sample window C (FIG. 3) it may be seen that the gain was sufficiently high that a very large number of pulses were counted during that sample window. Accordingly, the gain was reduced by setting the next most significant or sixth bit to a low state. During the next sample window D, it may be seen that a very small number of pulses exceeded the minimum threshold level. As an insufficient number of pulses were counted, during the sample window E, the gain was then increased by setting the next least significant bit at a high state. Upon examination of that state (sample window F) the number of counted bits was seen to exceed the desired level of 44, hence the next least significant bit was set high. As the number of counted transitions in that window still exceeded the desired number of counts, (sample window G) the yet next least significant bit was set high. In sample window H, the number of counted pulses was found to be approximately 44, and hence the desired gain set was accomplished. At the end of the sample windows, the most significant seventh bit is again set high so as to restore the output of the amplifier to the desired operating level. Thus, a twenty percent threshold is established due to the reinsertion of the gain of five associated with the seventh bit.

Having established the gain as described above, with the reference back to FIG. 2, it can be readily determined whether the head unit 20 is over the tape, as if the gain code is less than sixty the gain must have been established in response to a playback signal. Conversely, if the gain code is indicated to be in excess of sixty, such a result will only occur if the head is not over the tape. Box 84 thus represents a decision point at which the head must move either up or down, as shown in boxes 86 and 88 as appropriate, and the gain set procedure repeated as necessary until the measured gain code indicates that the head is on tape. At this point the sequence of operations setting the gain is completed.

The next sequence of operations pertains to determining an edge of tape reference position. This sequence of operation is particularly set forth in FIGS. 4 and 6, as further explained in conjunction with the waveshapes shown in FIG. 5. As set forth in the box 92, upon performing a gain set sequence, the record/playback unit will typically be positioned approximately 11 mils (280 $\mu$m) above a lower edge of the tape. Thus to minimize the number of steps necessary to determine the edge of tape reference position, the first operation moves the head unit down 8 mils (203 $\mu$m) so that it is positioned 3 mils (76 $\mu$m) above the edge of the tape. At the same time, a seek count value is established depending upon how many successive test record and playback operations are desired. Also, it is desired to set the edge high limit to a desired level depending upon the type cartridge being used. Thus, for example, if a type DC-1000 cartridge is being operated upon, wherein there are eighteen inches (48 cm) of tape between the BOT and LP points, such that if two inches (5.1 cm) of tape are required for each playback sequence a maximum of six such sequences playback could be performed for each recorded track. Similarly if a type DC-2000 cartridge is being implemented, wherein thirty inches (76 cm) of tape exists between the BOT and LP points, so that a maximum of fifteen two inch (5.1 cm) segments could be operated upon, a convenient edge high limit count could be nine. These two count values result in a seek bandwidth of 8.5 mils (216 $\mu$m) which corresponds to 54 possible steps.

Having thus appropriately set the count values a command is output to cause the write amplifier to write the 250 kilohertz test signal continuously from the BOT to LP points on the tape as shown in box 94. Further as shown in box 96, the direction of the tape is then reversed so as to go from LP to the BOT point, and as shown in box 98 two inches of tape are initially played back. A first inquiry will then determine whether data is present as shown in box 100. This will simply be indicated by the output from the counter 56 as an indication that the total number of counts during the sequence corresponding to the passage of a two inch (5.1 cm) length tape is greater than the above described minimum count of 44.

Figure 5:
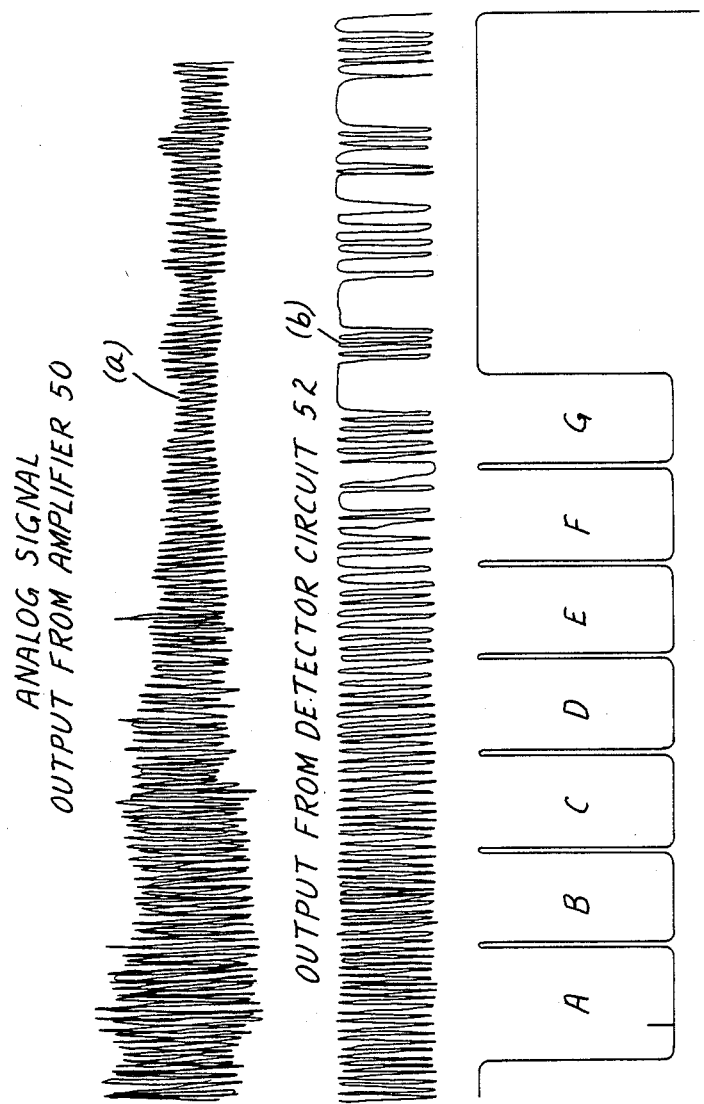
FIG. 5 is a representation of signal waveforms typically present in performing certain steps set forth in FIG. 4.

A graphic representation of the various signals present at both this and subsequent sequences is set forth in FIG. 5. Thus it may be seen that the analog output from the read amplifier 50 is set forth in the top Curve (a) of that Figure. As the signal is processed through the peak detector 52 a constant amplitude stabilized signal as shown in Curve (b) results, wherein only those peaks whose amplitude exceeds the previously established threshold are allowed to pass. The thus processed peaks are then counted within the counter 56 in the same manner as described above in conjunction with the gain set operations during successive sampling intervals A, B, C, D, E, F and G as shown in the bottom of FIG. 5. As there shown, the first sample period A is slightly longer in time in order to allow the initial signal to stabilize such that the sample window is actually initiated after a first one inch (2.5 cm) length of tape has passed. Since, as shown in the top Curve (a), all of the signal pulses are well above the minimum threshold a full number of possible counts will in all likelihood be counted by the counter such that the total count within the sample period A will be in the range of 8000.

Accordingly, as shown in box 102, instructions are then provided to cause the head unit to take a single step toward the edge and to increment the edge count by one unit. Following that step as shown in box 104, an inquiry is made to determine whether the edge limit is now equal to the edge count. Provided that it is not, instructions are provided to sample a second two inches (5.1 cm) of tape by repeating the sequence through boxes 98, 100 and 102 thereby stepping through as many sample intervals (B, C, D, E, F and G) as necessary. If within any of the sample windows it is determined that the number of counted transitions is less than 44, an edge found signal will be produced. At this point, approximately 1 mil (25.4 μm) of the 5 mil (127 μm) wide playback gap width (i.e., twenty percent) will still be on the tape. If after any of the sequences it is determined that the edge limit is equal to the edge count, such that no further sequential stepping and playing back of a previously recorded test signal is desired, the seek count is then decremented by one step as indicated in box 106 thereby causing a further test signal to be recorded along a new track at the same position as that at which the last playback signal was obtained. A new sequence of playback operations is then commenced beginning with the determination that the seek count is equal to zero, as shown in box 108. If it is not, a new sequence of record and successive record and playback operations is commenced by beginning again at box 94 and proceeding through boxes 96, 98 and 100, until an edge found signal is produced, or again as shown in box 106, decrementing the seek count an additional value and again iteratively going through the write and sequential playback and head stepping operations.

As further shown in box 108, if after any of the decremented seek count operations, the seek count is indicated to be equal to zero and it is determined that the head is already off tape as shown in box 110, the head is then stepped up 16 mils (406 μm) (box 112) and the sequence of operations beginning as shown in box 92 is reinitiated. If on the other hand it is found that the head is still on tape, a coarse edge seek operation is then commenced as shown in box 114.

During the coarse edge seek operation, the head is arbitrarily stepped 20 mils (508 μm) toward the edge, a test signal recorded, and a single playback sample obtained to determine if a signal is present. If such a signal is present, the head is again stepped an additional 20 mils (508 μm) toward the edge and another test signal recorded and another playback signal produced. Such operations are repeated until no playback signal is produced, thus ensuring that the head is off of the edge of the tape. At this point the head is repositioned 20 mils (508 μm) in the opposite direction thereby ensuring that the head is proximate to the edge of the tape. The head is then stepped down in sequences of 5 mils (127 μm) per step and single playback operations performed until no playback signal is obtained, again indicating that the head is off of the edge of the tape. The head is then stepped in the opposite direction 5 mils (127 μm) to ensure that the head is at least within 5 mils (127 μm) of the edge of the tape. The sequence of edge find operations beginning with box 92 is then reinitiated.

Figure 6:
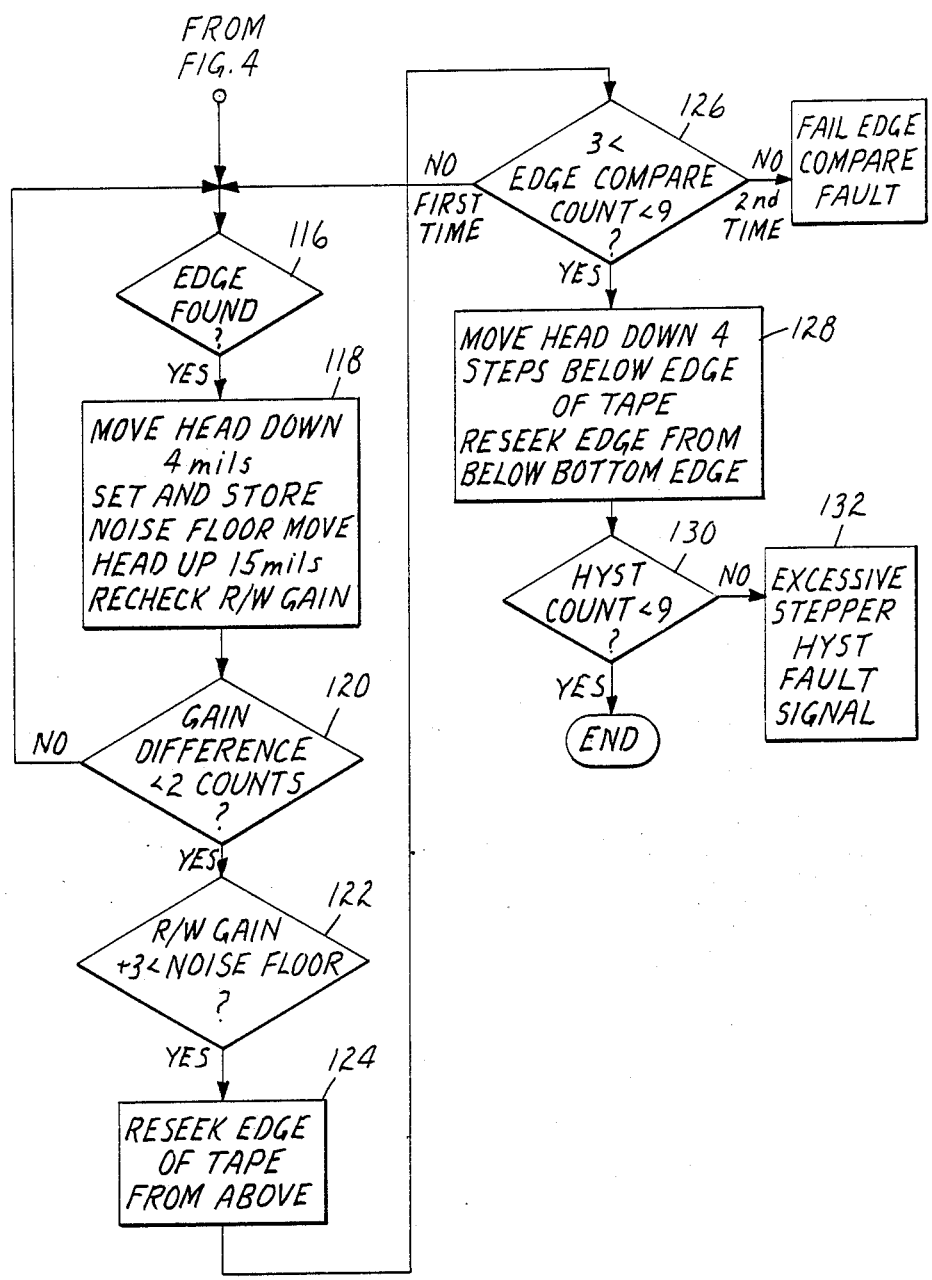
FIG. 6 is a flow sheet showing operations preferably performed in verifying a repeatable edge of tape reference position.

Assuming that at some point during the above operations an edge find signal was produced at the output of box 100, another sequence of operation is commenced to verify the accuracy of that reference position as shown in FIG. 6. Thus beginning at box 116 and going to box 118 the initial step is to verify that the gain has been properly determined. Thus the head is first moved down 4 mils (102 μm) off of the edge of tape and the noise floor is set to establish a proper signal to noise ratio. During such an operation the gain set operation as described above in conjunction with FIG. 2 is repeated in the absence of any playback signal as the head is now off the tape. The gain is repeatively decreased until fewer than 44 noise produced pulses are counted, thereby establishing a minimum gain for noise produced signals. At this point the head is moved 15 mils (381 μm) up onto tape and the gain setting is rechecked. As indicated in box 120 if the new gain setting is determined to be greater than two gain counts different from the previously selected gain setting, the new gain setting is taken as a desired gain level and the sequence of edge find operations is repeated.

Figure 4:
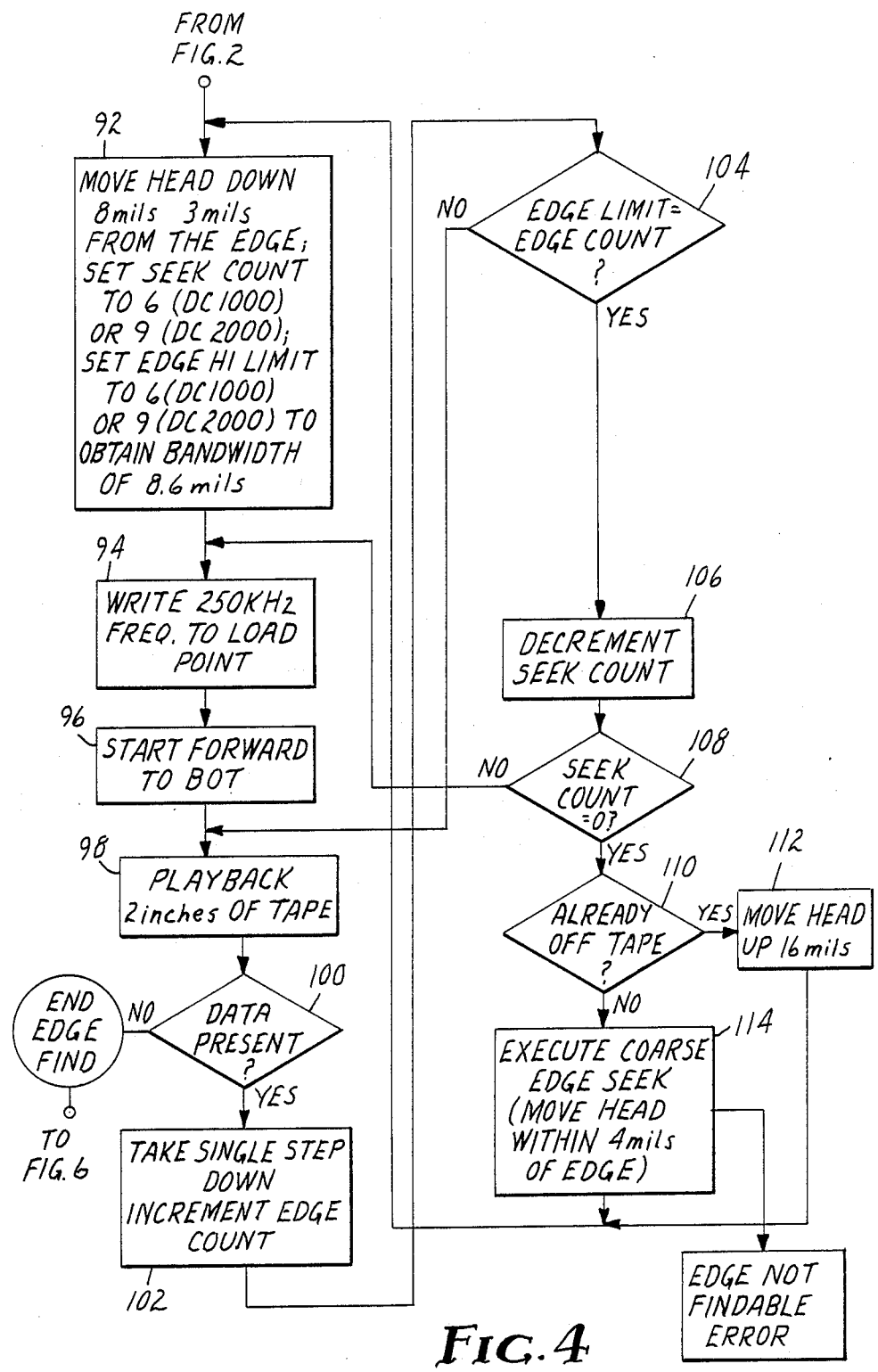
FIG. 4 is a flow diagram showing operations initially performed in determining an edge of tape reference position.

Conversely, if the gain difference is less than two counts, a check is determined to ensure that an adequate signal to noise ratio is present. This is done as indicated in box 122 by adding three gain counts to the established gain level and determining whether it is less than the previously established noise floor. If it is not less a fault signal is now produced. Assuming that it is appropriately less than the noise floor, verification of the edge of tape reference position is performed, as indicated in box 124, with the head positioned six steps up from the previously determined edge and repeating boxes 94 through 104 as shown in FIG. 4. A new edge of tape reference value is then determined and compared with the previously determined value, and if it is greater than three steps and less than nine steps different than the previously determined value, the further edge of tape position verification steps will be commenced. If the new value is not within the allowed range, a new edge of tape value will be determined as shown in boxes 92 through 104, and also the rechecking of the gain setting as shown in boxes 116 through 120 will be repeated.

Upon verifying an appropriate edge of tape value as indicated above, the head will next be stepped down four steps so as to be positioned below the edge of the tape as shown in box 128, and the head subsequently moved one step at a time toward the edge until a number of counts in any given sampling window exceeds the minimum count number of 44, at which point an edge found signal 130 will be produced. Such an operation is desired to ensure that no excessive stepper hysteresis is present in the system. Thus if the new established position is greater than nine counts different then the previous one, an excessive hysteresis fault signal will be produced, as indicated in box 132. Conversely if the new level is less than nine counts different from the previous level, a finally verified edge of tape reference position will be stored, from which subsequent positioning of the recording and playback unit may be indexed.

In the discussion presented above, it has been assumed that a wide record narrow read heads have been employed. Such an embodiment is particularly desirable as it enables the head unit to be sequentially stepped a number of times for each recorded track. Similarly however, head constructions may be utilized in which both record and read head are the same width, such embodiment requiring an additional record operation prior to each playback. The present invention may similarly be performed utilizing combined read and write heads having but a single gap. Other modifications such as utilizing the method in conjunction with half inch as well as quarter inch and other variations in tape and/or cartridge configurations may similarly be utilized.

I claim:

1. A method for recognizing a given edge of a magnetic recording tape comprising:
   (a) providing a record and playback unit including record means and playback means each having gaps parallel to each other, wherein the record gap width is less than one-tenth said tape width and the playback gap width is no greater than the gap width of the record means,
   (b) positioning said unit at a first transverse location away from said tape edge and recording a first test signal along a track having a transverse width at least equal to the gap width of said playback means,
   (c) playing back a corresponding playback test signal,
   (d) fixing the gain of a playback signal amplifier to provide an output at a predetermined level in the presence of a said playback signal,
   (e) storing as a reference value, a value which is a given fraction of said predetermined level and which corresponds to a minimum threshold detection level at which recorded signals are reliably detected,
   (f) recording a second test signal along a track bounded by said edge,
   (g) incrementally positioning said unit at a plurality of transverse locations, each of which is successively closer to said edge, and differs from a previous position by a small fraction of said record gap width and playing back a corresponding test signal at each successive transverse position,
   (h) comparing the level of each corresponding output from said signal amplifier with said stored reference value, and
   (i) storing information indicative of the transverse position of the unit when a given output signal is substantially equal to said reference value as an edge of tape reference position, thereby enabling subsequent transverse locations of the unit to be indexed relative to the edge of tape reference position to enable recording and playing back signals on any one of a plurality of parallel tracks along the tape.

2. A method according to claim 1, wherein after a said reference value is stored, the method further comprises the steps of:
   (a) moving said unit toward said edge and positioning said unit at a new transverse location spaced from said first location a distance approximately equal to the gap width of said record means,
   (b) recording a said second test signal on a track extending along the tape,
   (c) incrementally stepping said unit toward said edge one step at a time, each step being a distance equal to a, small predetermined fraction of said gap width of said record means and playing back a corresponding test signal at each successive transverse location, ceasing successive step and playback sequences when a said output signal is substantially equal to said reference value, or after the unit has moved toward said edge a given distance less than said record means gap width, whichever first occurs, and
   (d) recording a third test signal on a track if after moving said unit said given distance, said output signal level is still greater than said reference value, and repeating said successive step and playback sequences and/or recording yet additional test tracks until said output signal level is substantially equal to said reference signal level.

3. A method according to claim 1, wherein after a said edge of tape reference position is established, the method further comprises the additional step of positioning the unit a fraction of one track width toward the other edge of the tape, and repeating the successive step and playback sequences to determine another edge of tape reference position, and storing information indicative of a revised transverse position of the unit in the event said another reference position differs from the first determined reference position.

4. A method according to claim 1, wherein after said edge of tape reference position is established, the method further comprises the additional step of transversely positioning the unit outside the thus determined edge of tape, repeating successive step and playback sequence until an output signal level is detected which is substantially equal to said reference signal level to determine yet another edge of tape reference position, and using the additional reference position to confirm said reference position.

5. A method according to claim 1, further comprising the step of longitudinally positioning a near-end portion of the tape adjacent to said record and playback unit, said near-end portion being outside a more central region of the tape on which routine data would be or has been recorded, and recording and playing back said test signals on and from said near-end portion, thereby not interfering with data which may already be recorded on said more central region.

6. A method according to claim 5, further comprising the steps of detecting the initial presence of a tape adjacent to said record and playback unit and performing all of the previously recited steps upon each such detection, whereby a new reference value and a new edge of tape reference position is determined each time a tape is positioned adjacent the record and playback unit, thereby assuring that the unit is precisely referenced relative to the edge of the tape such that any one of a number of tracks parallel to the edge may be readily located.

7. A method according to claim 1, wherein the respective steps of recording and playing back said test signals further comprises recording said test signals while the tape is moving in a first longitudinal direction, and playing back said test signals while the tape is moving in the opposite longitudinal direction.

8. A method according to claim 1, comprising recording as a said first test signal, a test signal containing a series of pulses to thereby record onto at least a predetermined length of tape a predetermined number of flux transitions, playing back a corresponding playback test signal derived from the predetermined number of flux transitions, counting the number of transitions occurring in the playback test signal while said predetermined length of tape transverses the playback means, and fixing the gain of said playback signal amplifier to provide an output when a fixed number of transitions which are a given fraction of the transitions in the playback test signal are detected during the passage of said predetermined length of tape.

9. A method according to claim 8, wherein the step of fixing the gain further comprises:
   (a) modifying a said playback test signal to provide a calibrate signal which is a predetermined fraction of the playback test signal,
   (b) counting and comparing the number of transitions in the calibrate signal occurring during the passage of said predetermined length of tape with the number of transitions in the playback test signal normally counted during the passage of the same length of tape at successive settings of the gain of said playback signal amplifier, and
   (c) fixing the gain of said amplifier when the number of counted transitions in the calibrate signal equals said fixed number.

10. A method according to claim 9, wherein said predetermined number of flux transitions are recorded onto a said predetermined length of tape sufficiently long so as to provide a greater than minimum number of counts to compensate for temporary loss of playback signal due to normally anticipated dropouts and short term variations in tape edge.

11. A method for dynamically controlling the gain of a record/playback system independently of variations in tape type, head output and head to tape interface, comprising:
   (a) providing a record and playback unit including record means and playback means for recording and playing back signals at any of a plurality of parallel tracks extending along said tape,
   (b) applying to said record means a test signal containing a series of pulses and moving the tape past the record means, thereby recording onto at least a predetermined length of said tape a predetermined number of flux transitions,
   (c) moving the tape past said playback means to playback a corresponding playback test signal derived from the predetermined number of flux transitions,
   (d) counting and comparing the number of transitions normally occurring in said playback test signal while said predetermined length of tape transverses the playback means with the counted number of transitions in a calibrate playback test signal occurring during the passage of the same length of tape at successive settings of the gain of a playback signal amplifier, and
   (e) fixing the gain of said playback signal amplifier to provide an output when a fixed number of transitions which are a given fraction of the transitions in said playback test signal are detected during the passage of said predetermined length of tape, thereby establishing a minimum threshold detection level at which flux transitions having an intensity at least as great as said given fraction are reliably detected.

12. A method according to claim 11, wherein the step of fixing the gain further comprises:
   (a) modifying a said playback test signal to provide a calibrate signal which is a predetermined fraction of the playback test signal,
   (b) counting and comparing the number of transitions in the calibrate signal occurring during the passage of said predetermined length of tape with the number of transitions in the playback test signal normally counted during the passage of the same length of tape at successive settings of the gain of said playback signal amplifier, and
   (c) fixing the gain of said amplifier when the number of counted transitions in the calibrate signal equals said fixed number.

13. A method according to claim 11, wherein said predetermined number of flux transitions are recorded onto a said predetermined length of tape sufficiently long so as to provide a greater than minimum number of counts to compensate for temporary loss of playback signal due to normally anticipated dropouts and short term variations in tape edge.

14. A method according to claim 11, further comprising:
   (a) recording a said test signal along a track bounded by one edge of the tape, and extending along at least a predetermined length thereof,
   (b) incrementally positioning said playback means at a plurality of transverse locations, each of which is a small fraction of the width of the recorded track closer to the edge, and playing back a corresponding test signal at each successive position as a said predetermined length of tape transverses said playback means,
   (c) counting the number of transitions occurring in said corresponding test signal during the passage of said predetermined length of tape, the intensity of which exceeds said minimum threshold detection level,
   (d) comparing the number of counted transitions in the test signal occurring during the tape passage with said fixed number, and
   (e) storing information inicative of the transverse position of the playback head when the number of counted transitions falls below said fixed number, as an edge of tape reference position, whereby the reference position is established when the same fraction of the playback means remains on the tape as that fraction determined by said minimum threshold detection level, thus enabling subsequent transverse locations of said record and playback unit to be indexed relative to the edge of tape reference position to enable subsequent recording and playback of signals on any of a plurality of parallel tracks along the tape.

15. A system for recognizing a given edge of a magnetic recording tape comprising:

(a) a record and playback unit including record means and playback means each having gaps parallel to each other, whrein the record gap width is no greater than the gap width of the record means, (b) means for positioning said unit at a first transverse location away from said tape edge and for recording a first test signal along a track having a transverse width at least equal to the gap width of said playback means, (c) means for playing back a corresponding playback test signal, (d) means for fixing the gain of a playback signal amplifier to provide an output at a predetermined level in the presence of a said playback signal, (e) means for storing as a reference value, a value which is a given fraction of said predetermined level and which corresponds to a minimum threshold detection level at which recorded signals are reliably detected, (f) means for recording a second test signal along a track bounded by said edge, (g) means for incrementally positioning said unit at a plurality of transverse locations, each of which is successively closer to said edge, and differs from a previous position by a small fraction of said record gap width and playing back a corresponding test signal at each successive transverse position, (h) means for comparing the level of each corresponding output from said signal amplifier with said stored reference value, and (i) means for storing information indicative of the transverse position of the unit when a given output signal is substantially equal to said reference value as an edge of tape reference position, whereby the edge of tape reference position is established when the same fraction of the playback means remains on the tape as that fraction determined by said minimum threshold detection level, thus enabling subsequent transverse locations of the unit to be indexed relative to the edge of tape reference position to enable recording and playing back signals on any one of a plurality of parallel tracks along the tape.

16. A system according to claim 15, further comprising means for positioning the unit a fraction of one track width toward the other edge of the tape, means for repeating the successive step and playback sequences to determine another edge of tape reference position, and means for storing information indicative of a revised transverse position of the unit in the event said another reference position differs from the first determined reference position.

17. A system according to claim 15, further comprising means for transversely positioning the unit outside the thus determined edge of tape, means for repeatng successive step and playback sequence until an output signal level is detected which is substantially equal to said reference signal level to determine yet another edge of tape reference position, and means for using the additional reference position to confirm said reference position.

18. A system according to claim 15, further comprising means for longitudinally positioning a near-end portion of the tape adjacent to said record and playback unit, said near-end portion being outside a more central region of the tape on which routine data would be or has been recorded, such that said test signals are recorded and played back on and from said near-end portion, thereby not interfering with data which may already be recorded on said more central region.

19. A system according to claim 18, further comprising means for detecting the initial presence of a tape adjacent to said record and playback unit and for performing all of the previously recited steps upon each such detection, whereby a new reference position is determined each time a tape is postioned adjacent to the record and playback unit, thereby assuring that the unit is precisely referenced relative to the edge of the tape such that any one of a number of tracks parallel to the edge may be readily located.

20. A system for dynamically controlling the gain of a record/playback apparatus independently of variations in tape type, head output and head to tape interface, comprising:

(a) a record and playback unit including record means and playback means for recording and playing back signals at any of a plurality of parallel tracks extending along said tape, (b) means for applying to said record means a test signal containing a series of pulses and for moving the tape past the record means, thereby recording onto at least a predetermined length of said tape a predetermined number of flux transitions, (c) means for moving the tape past said playback means to playback a corresponding playback test signal derived from the predetermined number of flux transitions, (d) means for counting and comparing the number of transitions normally occurring in said playback test signal while said predetermined length of tape transverses the playback means with the counted number of transitions in a calibrate playback test signal occurring during the passage of the same length of tape at successive settings of the gain of a playback signal amplifier, and (e) means for fixing the gain of said playback signal amplifier to provide an output when a fixed number of transitions which are a given fraction of the transitions in said playback test signal are detected during the passage of said predetermined length of tape, thereby establishing a minimum threshold detection level at which flux transitions having an intensity at least as great as said given fraction are reliably detected.

21. A system according to claim 20, wherein the means for fixing the gain further comprises:

(a) means for modifying a said playback test signal to provide a calibrate signal which is a predetermined fraction of the playback test signal, (b) means for counting and comparing the number of transitions in the calibrate signal occurring during the passage of said predetermined length of tape with the number of transitions in the playback test signal normally counted during the passage of the same length of tape at successively settings of the gain of said playback signal amplifier, and (c) means for fixing the gain of said amplifier when the number of counted transitions in the calibrate signal equals said fixed number.

22. A system according to claim 20, wherein said means for recording said predetermined number of flux transitions further comprises means for recording said predetermined number onto a said predetermined length of tape sufficiently long so as to provide a greater than minimum number of counts, to compensate for temporary loss of playback signal due to normally anticipated dropouts and short term variations in tape edge.

\* \* \* \* \*